Oct. 22, 1968    D. L. McKAY ET AL    3,406,527
SEPARATION BY CRYSTALLIZATION
Filed Aug. 11, 1966
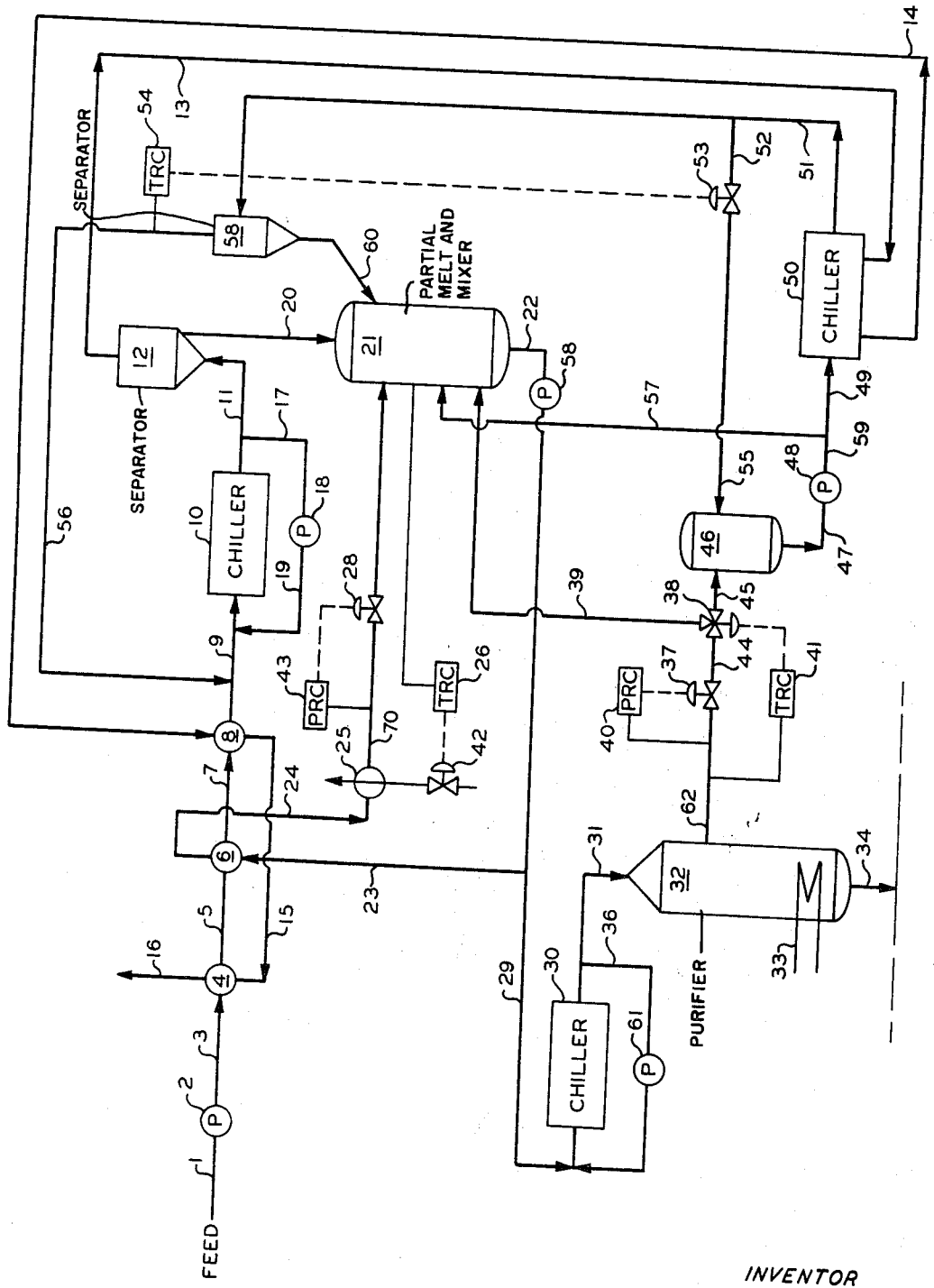
INVENTOR
D. L. MCKAY
F. M. BRINKMEYER
BY
Young & Quigg
ATTORNEYS ３,406,527
SEPARATION BY CRYSTALLIZATION
Dwight L. McKay and Francis M. Brinkmeyer, Bartlesville, Okla., assignors to Phillips Petroleum Company, a corporation of Delaware
Filed Aug. 11, 1966, Ser. No. 571,790
9 Claims. (Cl. 62—58)

This invention relates to separation by crystallization. In one aspect it relates to an improved process for separating a plurality of fluids by fractional crystallization. In another aspect, it relates to an improved apparatus suitable for separation of a plurality of liquids by fractional crystallization.

Purification by means of fractional crystallization has been known for a number of years. Re. 23,810, Schmidt, 1954, discloses and claims a process and apparatus for purifying crystals, which process involves moving a mixture of crystals and adhering liquid through a liquid removal zone, a reflux zone, and a melting zone, removing liquid in said liquid removal zone, melting crystals in said melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystalization. For example, the process can be used for the concentration of fruit juices, vegetable juices, and other materials which comprise aqueous solutions which can be concentrated by the formation and removal of ice crystals. This process is also of great value to the resolution of non-aqueous mixtures, an example of such an application being the separation of para-xylene from a mixture thereof with other xylene isomers and ethylbenzene.

More recenty there has been proposed a process and apparatus for affecting a separation of the type described at higher throughput rates, improved stability and ease of operation, and improved heat distribution. In addition, products of high purity are obtainable over long periods of operation. In the above-mentioned process, solids are countercurrently contacted with a reflux liquid in a purification zone, the solids in said zone are contacted with an intermittent flow of reflux liquids simultaneously with the proportion of the solids through said zone. This process is disclosed and claimed in U.S. 2,854,494 issued to R. W. Thomas on Sept. 30, 1956.

According to the invention, product purity when using a fractional crystallization apparatus can be increased by returning the column mother liquor to the column feed stream in the following manner. First a portion of the column mother liquor is recycled to a point upstream from the second chiller and another portion of the column mother liquor is chilled and the stream passed to a liquid solids separation zone wherein the solids are separated and introduced into the column feed stream at a point downstream from the first chiller and upstream from the second chiller which precedes the column, and the resulting liquid phase is introduced in the column feed stream at a point upstream of the first chiller. When the process is carried out in this manner, not only is a high purity product produced, but refrigeration costs are preserved by eliminating a large quantity of heated column mother liquor that must be recycled through the first and second chilling operations. Another embodiment of the invention is a novel method of and apparatus for restoring the purification column to normal operation during upsets due to equipment malfunction by recycling the column mother liquor through a chiller in response to a high mother liquor stream temperature. This occurs infrequently when the column channels.

It is an object of this invention to provide an improved method for fractionally separating a plurality of liquids by crystallization. Another object of this invention is to provide an improved apparatus suitable for fractional crystallization of a liquid mixture. A further object of this invention is to provide an improved process and apparatus for fractionally separating a liquid mixture using a fractional crystallization column apparatus. Other aspects, objects, and the several advantages of this invention will be apparent from the study of this disclosure, the drawing, and appended claims.

Referring now to the drawing, the operation will be described as applied to the separation of para xylene (PX) from a mixture containing it and other isometric xylenes (IX). The mixture of PX and IX is fed by means of conduit 1, pump 2 and conduit 3 to precooler 4, which is an indirect heat exchanger cooled by the cold filtrate stream from filter 12. The feed stream then passes from precooler 4 to precooler 6 via conduit 5. Precooler 6 is an indirect heat exchanger in which the above-mentioned feed stream is precooled by a portion of the purification column feed stream passing through conduit 23. The mixture then leaves precooler 6 via conduit 7 and enters precooler 8. Precooler 8 is another indirect heat exchanger in which the above-mentioned feed stream is precooled by the same cold filtrate stream from filter 12 which cools the stream in precooler 4. The feed stream then passes to primary chiller 10 via conduit 9. Mother liquor from cyclone 58 and the chiller recycle stream are mixed with the feed stream in conduit 9 via conduits 56 and 19, respectively. The stream is partially frozen in the primary chiller 10 and a portion of the resulting slurry is passed to filter 12 via conduit 11, and the other portion of the resulting slurry is recycled around chiller 10 to conduit 9 via conduit 17, pump 18 and conduit 19. Filter 12 may be replaced by any fluid solids separation zone known in the art such as a cyclone or a centrifuge. Mother liquor from filter 12 passes to chiller 50 which is an indirect heat exchange means via conduit 13. The warmed mother liquor then passes to precooler 8 via conduit 14, and from precooler 8 to precooler 4 via conduit 15, and from precooler 4 via conduit 16. Solids, now more concentrated in PX, are passed to slurry tank 21 via conduit 20 wherein they are at least partially melted by a heated and recycled portion of the purification column feed stream entering the said slurry tank via conduit 70, and a portion of the mother liquor from the purification column 32 entering said slurry tank via conduit 57. The resulting stream is withdrawn from slurry tank 21 via conduit 22, pump 58, and conduit 29. A portion of the above-mentioned stream is withdrawn via conduit 23 and is passed into precooler 6 wherein it is warmed. The warmed portion then passes to steam heater 25 via conduit 24. Temperature controller 26 operates steam control valve 42 for steam heater 25 in response to temperature variations in slurry tank 21. The said portion then passes from steam heater 25 to slurry tank 21 via conduit 70. Valve means 28 is operatively connected to conduit 70 and is operated by pressure controller 43 which controls the valve means 28 within conduit 70.

The non-recycled portion of the said resulting stream from slurry tank 21 is passed to secondary chiller 30 via conduit 29, wherein it is cooled to a higher temperature than in chiller 10, resulting in partial freezing. One portion of the resulting slurry is recycled to conduit 29 via conduit 36 and pump 61. Another portion of the resulting slurry is passed by conduit 31 to fractional crystallization apparatus 32 containing a heating means 33. This apparatus can be the type disclosed in Re. 23,810 or U.S. Patent 2,854,494. Purified PX product is withdrawn by line 34. Mother liquor, poorer in PX than product stream 34 or feed stream 31, is withdrawn by conduit 62 wherein it passes through valve 37 which is controlled by pressure controller 40 and to three-way valve 38 via conduit 44. During normal column operation, three-way valve 38 is maintained in a first position so that conduit 44 will communicate with conduit 45. During plant start-up or during column upset due to equipment malfunction when the temperature of the stream in conduit 62 rises above predetermined maximum and the para xylene concentration of the stream is high, valve 38 is changed to a second position in response to temperature controller 41. While in the second position, conduit 44 communicates with conduit 39 and the mother liquor from column 32 will be recycled to the slurry tank 21. This diversion continues until column operation is restored to satisfactory performance as indicated by the stream temperature in conduit 62. For example, in the separation of para xylene, the mother liquor from the purification column is about 9° F. A stream temperature in conduit 62 of about 20° F. will indicate that separation column 32 is not operating efficiently. Therefore, when the stream temperature in conduit 62 reaches some temperature above 9° F., say 20° F., temperature controller 41 will change valve 38 to a second position so that the stream flowing through conduit 62 and 44 will be diverted into conduit 39. During normal operation, valve 38 will be in a first position so that fluid will flow through conduit 44 to collection tank 46 via conduit 45. The mother liquor is withdrawn from collection tank 46 via conduit 47, pump means 48, conduits 59 and 49, and introduced into chiller 50. A portion of the stream flowing from pump 48 is recycled to slurry tank 21 via conduit 57. The mother liquor stream is cooled within chiller 50 until a portion of the PX therein is frozen. A portion of the resulting slurry is then passed through conduit 51 to cyclone 58. Another portion of the stream flowing through conduit 51 is withdrawn via conduit 52, and passes through valve means 53 and conduit 55 into collection tank 46. Temperature controller 54 operates valve means 53 in response to the liquid temperature in conduit 56. When the liquid in conduit 56 from cyclone 58 rises above a predetermined temperature, temperature controller 54 will cause valve 53 to open and thereby cause a greater portion of the slurry passing through chiller 50 to be recycled into collection tank 46. Cyclone 58 can be replaced by any fluid solids separation zone known in the art such as a filter or centrifuge. The motor liquor from cyclone 58 is passed to conduit 9 via conduit 56.

This invention can be better illustrated by the use of the following example.

*Example*

Table I illustrates the feed compositions and feed stream temperatures entering primary chiller 10.

TABLE I

| Component (lb./hr.) | Stream in conduit | | | |
|---|---|---|---|---|
| | 1 | 56 | 19 | 9 |
| | Fresh feed | Mother liquor to primary | Primary chiller recycle | Total feed to primary |
| Ethyl benzene | 13,980 | 1,406 | 15,386 | 30,772 |
| Para xylene | 14,880 | 1,390 | 16,270 | 32,540 |
| Meta xylene | 33,598 | 3,378 | 36,976 | 73,952 |
| Ortho xylene | 9,014 | 906 | 9,920 | 19,840 |
| Others | 64 | 7 | 71 | 142 |
| Total | 71,536 | 7,087 | 78,623 | 157,246 |
| Percent solids | 0 | 0 | 13 | 7 |
| Temperature, °F | 120 | −46 | −90 | −59 |

Table II illustrates the material balance around filter 12.

TABLE II

| Component (lb./hr.) | Stream in conduit | | |
|---|---|---|---|
| | 11 | 13 | 20 |
| | Net feed to filter | Filtrate | Cake |
| Ethyl benzene | 15,386 | 13,968 | 1,418 |
| Para xylene | 16,270 | 5,135 | 11,135 |
| Meta xylene | 36,976 | 33,568 | 3,408 |
| Ortho xylene | 9,920 | 9,006 | 914 |
| Others | 71 | 64 | 7 |
| Total | 78,623 | 61,741 | 16,882 |
| Percent solids | 13 | 0 | 61 |
| Temperature, °F | −90 | −90 | −90 |

Table III illustrates a material balance around cyclone 58 and the compositions and temperature of feed streams 20, 60, and 57 entering slurry tank 21 which ultimately enter fractionation column 32 via secondary chiller 30 and conduit 31.

TABLE III

| Component (lb./hr.) | Stream in conduit | | | | | |
|---|---|---|---|---|---|---|
| | 20 | Column recycle | | | 57 | 31 |
| | | 51 | 60 | 56 | | |
| | Cake | Total | Solids to slurry tank | Filtrate | Second stage recycle | Column feed |
| Ethyl benzene | 1,418 | 1,519 | 113 | 1,406 | 367 | 1,900 |
| Para xylene | 11,135 | 6,607 | 5,217 | 1,390 | 1,599 | 17,950 |
| Meta xylene | 3,408 | 3,650 | 272 | 3,378 | 883 | 4,562 |
| Ortho xylene | 914 | 979 | 73 | 906 | 237 | 1,224 |
| Others | 7 | 7 | | 7 | 2 | 8 |
| Total | 16,882 | 12,762 | 5,675 | 7,087 | 3,088 | 25,644 |
| Percent solids | 61 | 40 | 90 | 0 | 0 | 40 |
| Temperature, °F | −90 | −50 | −46 | −46 | 12 | 9 |

Table IV illustrates the material balance around purification column 32 by showing the product stream which leaves via conduit 34, and the mother liquor which leaves the column via conduit 62.

TABLE IV

| Component (lb./hr.) | Stream in conduit | |
|---|---|---|
| | 62 | 34 |
| | Column mother liquor | Product |
| Ethyl benzene | 1,888 | 12 |
| Para xylene | 8,204 | 9,745 |
| Meta xylene | 4,534 | 29 |
| Ortho xylene | 1,216 | 8 |
| Others | 8 | |
| Total | 15,850 | 9,794 |
| Percent solids | 0 | 0 |
| Temperature, °F | 9 | 80 |

The above example is not intended to limit the scope of this invention. The method and apparatus of this invention can be advantageously utilized in practically any system to which fractional crystallization is applicable. For example, this invention can be utilized to purify naphthalene, hydroquinone (1,4 - benzenediol), para-cresol, para-dichlorobenzene, high melting waxes, fatty acids, and high molecular weight normal paraffins. Furthermore, the system can be used to separate durene (1,2,4,5-tetramethylbenzene) from $C_{10}$ aromatics or methylvinylpyridine from a mixture containing it and methylethylpyridine.

We claim:

1. A process of separation and purification of at least one of the components of a fluid mixture comprising steps of:
    (a) cooling said mixture in a first cooling zone sufficient to cause a portion thereof to crystallize and to thereby form a first crystal slurry;
    (b) passing the said first crystal slurry to a first fluid solids separation zone and separating the crystals from the fluid phase therein;
    (c) passing the said crystals to a heating zone and melting a portion of the said crystals therein to form a second crystal slurry;
    (d) passing the said second crystal slurry to a second cooling zone and causing a further portion thereof to crystallize and to thereby form a third crystal slurry;
    (e) passing the said third crystal slurry to a crystal purification zone wherein the crystalline portion of the said third crystal slurry is countercurrently contacted with melt resulting from heating thereof;
    (f) withdrawing said melt as product of the process;
    (g) withdrawing the fluid portion of said third crystal slurry from said crystal purification zone, and passing the said fluid portion to a third cooling means wherein the said fluid portion is cooled sufficient to cause a portion thereof to crystallize and to thereby form a fourth crystal slurry;
    (h) passing the said fourth crystal slurry to a second fluid solids separation zone and separating the crystals from the fluid phase; and
    (i) passing the said crystals to the said heating zone of step (c), and the fluid to the said feed mixture entering the first cooling zone.

2. The process of claim 1 wherein the third cooling zone is refrigerated and the feed mixture is precooled by the fluid phase from the first fluid solids separation zone, and the said fourth crystal slurry is recycled around the said third cooling zone, the amount recycled manipulated, in response to temperature of the liquid phase from the said second fluid solids separation zone.

3. The process of claim 2 wherein the second crystal slurry from the said heating zone is divided into two portions, one portion is warmed by extracting heat from the feed mixture and then by addition of heat from an external source, and then said portion is recycled to the said heating zone, and a second portion is passed to the said second cooling zone.

4. The process of claim 3 wherein the said fluid portion of the said third slurry withdrawn from said crystal purification zone is recycled to said heating zone in response to temperature variation of said fluid portion.

5. Fluid purification apparatus comprising a first cooling means with a first conduit means adapted to receive fluid mixture and operatively connected to said first cooling means, a first fluid solids separation means for separating solids from liquids with a second conduit means communicating between said first cooling means and said first fluid solids separation means, heating and mixing means adapted to heat and mix solids from first separation means, a third conduit means adapted to receive separated solids from said first fluid solids separation means communicating between said first separation means and the heating and mixing means, a second cooling means, a fourth conduit means communicating between said heating and mixing means and said second cooling means, fractional purification means comprising an elongated vessel having a liquid permeable wall section intermediate the ends, liquid withdrawal and heating means at one end, fluid introduction means at the opposite end, liquid receiving means connecting to the permeable wall section, a fifth conduit means communicating between the said second cooling means and the said fluid introduction means, a third cooling means, a sixth conduit means communicating between said liquid receiving means and said third cooling means, a second fluid solids separation means, a seventh conduit means communicating between said second fluid solids separation means and said third cooling means, an eighth conduit means adapted to receive separated solids from said second fluid solids separation means communicating between said second fluid solids separation means and said heating and mixing means, a ninth conduit means communicating between said second fluid solids separation means and said first conduit means.

6. Apparatus of claim 5 having a tenth conduit means adapted for product removal and communicating with said liquid withdrawal means, a collection tank means associated with said sixth conduit means, an eleventh conduit means communicating between said seventh conduit means and said collection tank means, a valve means associated with said eleventh conduit means adapted to direct flow to said collection tank means in response to temperature of the fluid in said ninth conduit means.

7. Apparatus of claim 6 having a twelfth conduit means connecting the said first fluid solids separation means and the third cooling means, a first feed precooling means associated with the first conduit means, a thirteenth conduit means connecting the third cooling means with the first feed precooling means, a second feed precooling means associated with said first conduit means, a fourteenth conduit means connecting said first feed precooling means and said second precooling means, a fifteenth conduit means operatively connected to said second feed precooling means.

8. The apparatus of claim 7 having a three-way valve means associated with said sixth conduit means and a sixteenth conduit means operatively connected between said three-way valve means and said heating and mixing means adapted to direct flow from the said sixth conduit means to the said sixteenth conduit means in response to temperature variation of the fluid in said sixth conduit means, a seventeenth conduit means connecting said sixth conduit means to said heating and mixing means, said seventeenth conduit means connected to said sixth conduit means at a point downstream of said three-way valve means.

9. Apparatus of claim 8 wherein said heating and mixing means comprises: a slurry tank, a third feed precooling means associated with the said first conduit means, an eighteenth conduit means connecting the slurry tank with said third feed precooling means, an eighteenth conduit means connecting the said fourth conduit means with the said third feed precooling means, a nineteenth conduit means connecting the said third feed precooling means with the said slurry tank, and a heating means associated with said nineteenth conduit means.

References Cited
UNITED STATES PATENTS

| | | |
|---|---|---|
| 2,815,364 | 12/1957 | Green. |
| 2,895,835 | 7/1959 | Findlay. |
| 3,050,953 | 10/1962 | Wilson _____ 62—58 |
| 3,082,211 | 3/1963 | Green _____ 62—58 |

NORMAN YUDKOFF, *Primary Examiner.*